United States Patent
Geva et al.

(10) Patent No.: US 9,600,298 B2
(45) Date of Patent: Mar. 21, 2017

(54) ACTIVE AND EFFICIENT MONITORING OF A GRAPHICAL USER INTERFACE

(71) Applicant: International Business Machines Corporation, Armonk, NY (US)

(72) Inventors: Amir Geva, Yokneam (IL); Sivan Harary, Haifa (IL); Mattias Marder, Haifa (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 667 days.

(21) Appl. No.: 13/872,166

(22) Filed: Apr. 29, 2013

(65) Prior Publication Data

US 2014/0325409 A1 Oct. 30, 2014

(51) Int. Cl.
G06F 9/44 (2006.01)
G06F 3/0481 (2013.01)

(52) U.S. Cl.
CPC .......... G06F 9/4443 (2013.01); G06F 3/0481 (2013.01)

(58) Field of Classification Search
CPC ........................................ G06F 3/0481; G06F 2203/04803–2203/04805
See application file for complete search history.

(56) References Cited

U.S. PATENT DOCUMENTS

| | | | |
|---|---|---|---|
| 5,859,639 A * | 1/1999 | Ebrahim | 715/788 |
| 6,446,119 B1 | 9/2002 | Olah et al. | |
| 6,778,703 B1 * | 8/2004 | Zlotnick | 382/218 |
| 6,978,303 B1 | 12/2005 | McCreesh et al. | |
| 8,171,406 B1 | 5/2012 | Newstadt et al. | |
| 2005/0285947 A1 * | 12/2005 | Grindstaff et al. | 348/208.4 |
| 2009/0177766 A1 | 7/2009 | Batot et al. | |
| 2009/0226052 A1 * | 9/2009 | Fedele et al. | 382/125 |

(Continued)

FOREIGN PATENT DOCUMENTS

CA 2340408 C 9/2009

OTHER PUBLICATIONS

Chang Shin-Hung, "R2A: Real-time Resolution Adapter for Asymmetric Computer Screen Recording", Services Computing Conference (APSCC), 2011 IEEE Asia-Pacific, pp. 195-202 , Dec. 2011.

(Continued)

*Primary Examiner* — Jeffrey A Gaffin
*Assistant Examiner* — Mandrita Brahmachari
(74) *Attorney, Agent, or Firm* — Suzanne Erez; Jason H. Sosa; William H. Hartwell

(57) ABSTRACT

Machines, systems and methods for recognizing visual change in a graphical user interface (GUI) environment, the method comprising determining position of an active GUI object in the GUI environment based on known attributes of the active GUI object; monitoring a focus area in the active GUI object to detect visual changes in attributes of the focus area, without regard to any visual changes outside the focus area; determining whether the active GUI object has moved or has been resized, in response to determining a visual change in the attributes of the focus area; and determining position of a new active GUI object in the GUI environment, in response to determining that the active GUI object has not been moved or has not been resized.

18 Claims, 6 Drawing Sheets

(56) References Cited

U.S. PATENT DOCUMENTS

| | | |
|---|---|---|
| 2010/0235406 A1* | 9/2010 | Williams et al. ............ 707/803 |
| 2010/0306163 A1* | 12/2010 | Beaty ................... G06F 9/5077 706/52 |
| 2011/0006881 A1 | 1/2011 | Hogaboom et al. |
| 2011/0047496 A1* | 2/2011 | Harrison ............... G06F 11/328 715/772 |
| 2012/0079103 A1 | 3/2012 | Wang et al. |
| 2012/0151360 A1 | 6/2012 | Molander et al. |
| 2013/0246039 A1* | 9/2013 | Duneau ................... G09G 5/40 704/2 |
| 2014/0258872 A1* | 9/2014 | Spracklen ........... H04L 41/5009 715/736 |

OTHER PUBLICATIONS

Kernel Data Recovery, "Desktop Monitoring Software", 2013. http://www.desktopmonitoring.net.

\* cited by examiner

ACTIVE AND EFFICIENT MONITORING OF A GRAPHICAL USER INTERFACE

COPYRIGHT & TRADEMARK NOTICES

A portion of the disclosure of this patent document may contain material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of the applicant, the assignee or third parties affiliated or unaffiliated with the applicant or the assignee. Use of these marks is for providing an enabling disclosure by way of example and shall not be construed to exclusively limit the scope of the disclosed subject matter to material associated with such marks.

TECHNICAL FIELD

The disclosed subject matter relates generally to graphical user interfaces in a computing environment and, more particularly, to a system and method for monitoring changes to active elements in a graphical user interface.

BACKGROUND

Software tools have been implemented for the purpose of automated monitoring of user or system initiated events that take place in a computing environment. Such automated monitoring can help introduce efficiencies into the computing environment by relieving a human operator from having to constantly monitor and look for certain events. For example, it may be desirable to monitor changes to the status of a graphical user interface (GUI) window appearing on a user screen to determine and track the software applications that are being actively utilized by a user. The monitoring can, for example, provide details related to the amount of time certain applications are utilized and help an administrator better understand the needs of the users.

To monitor events, most tools rely on information provided by the local operating system or the application programming interface (API) running locally on the user computer, where the GUI objects are rendered. In remotely serviced GUI environments (e.g., web-based consoles), the GUI data is rendered on a remote server and then delivered as a bitmap to a user terminal. In these cases, the local operating system is not aware of the object-based GUI data (e.g., placement data for an object on the screen). Therefore, other methods such as recording the entire GUI environment may be necessary to determine the changes in the GUI environment on the user's computer screen.

SUMMARY

For purposes of summarizing, certain aspects, advantages, and novel features have been described herein. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

Machines, systems and methods for recognizing change in a graphical user interface (GUI) environment are provided. The method comprising determining position of an active GUI object in the GUI environment based on known attributes of the active GUI object; monitoring a focus area in the active GUI object to detect changes in attributes of the focus area, without regard to any changes outside the focus area; determining whether the active GUI object has moved or has been resized, in response to determining a change in the attributes of the focus area; and determining position of a new active GUI object in the GUI environment, in response to determining that the active GUI object has not been moved or has not been resized.

In accordance with one or more embodiments, a system comprising one or more logic units is provided. The one or more logic units are configured to perform the functions and operations associated with the above-disclosed methods. In yet another embodiment, a computer program product comprising a computer readable storage medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The disclosed subject matter is not, however, limited to any particular embodiment disclosed.

BRIEF DESCRIPTION OF THE DRAWINGS

The disclosed embodiments may be better understood by referring to the figures in the attached drawings, as provided below.

Features, elements, and aspects that are referenced by the same numerals in different figures represent the same, equivalent, or similar features, elements, or aspects, in accordance with one or more embodiments.

DETAILED DESCRIPTION OF EXAMPLE EMBODIMENTS

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

Figure 1:
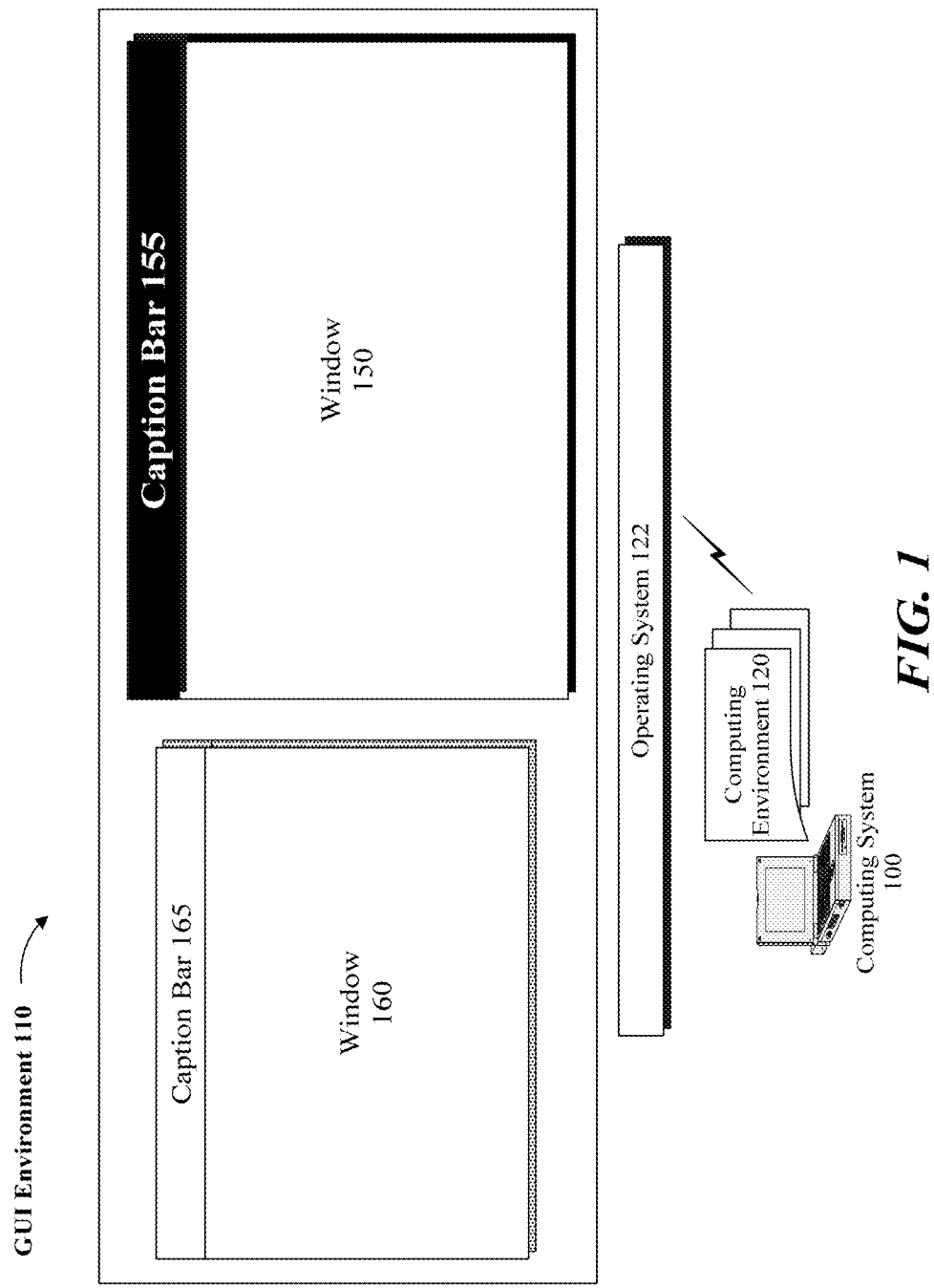
FIG. 1 illustrates an exemplary graphical user interface (GUI) environment in accordance with one or more embodiments, wherein changes in the GUI environment are monitored.

Referring to FIG. 1, an exemplary graphical user interface (GUI) environment 110 is illustrated, wherein a computing system 100 supports the execution of an operating system 122 in a computing environment 120. As shown, GUI objects such as windows 150 and 160 may be displayed on a display screen, in accordance with one aspect, responsive to one or more software applications being executed either locally on top of computing system 100's operating system 122 or remotely on a server (not shown) connected to computing system 100. If GUI environment 110 is rendered on a remote server, then the images of the GUI environment 110 are delivered to computing system 100 and displayed on a local display.

In one embodiment, it is desirable to detect and monitor the location of an active GUI object or element (e.g., a GUI window) displayed on a display screen connected to computing system 100 by processing information gathered by way of image capture. As provided in further detail below, a screen capture is performed to copy an image of one or more content or the entire GUI environment 110 as displayed on the display screen.

In a scan phase, a process may be used to traverse the captured image to find pixels (or groups of pixels) with attributes (e.g., colors or patterns) that match predetermined attributes that can be used to identify an area in an active window (e.g., the "title bar" or the "caption bar") that is visually distinguishable from a corresponding area in an inactive window.

As shown in FIG. 1, a caption bar 155 is an elongated horizontally-positioned bar across the top edge of a GUI window 150. The caption bar 155 may include text and may be rendered in a solid color fill, or gentle gradient, based on the features of the operating system 122 or other system display settings or theme. For instance, the Microsoft® Windows XP's default theme renders the capture bar area for an active window in solid blue and provides the user with additional options or themes to change the color of the caption bar (along with other display features) to yellow, green or other color or color combinations. An active window is the window that is being utilized in the foreground and will primarily receive any keyboard events (e.g., window 150). An inactive window in contrast is one that is in the background (e.g., window 160).

In the following, one or more embodiments are disclosed by way of example as applicable to GUI objects or elements represented in form of rectangular GUI windows (i.e., windows 150 and 160) and as rendered in a GUI environment utilizing an operating system 122 such as Microsoft Windows. As noted earlier, the rendering of the images may be performed either locally on computing system 100 or remotely on a different computing system which then delivers the rendered images to computing system 100. It should be noted that the concepts and methods disclosed here are applicable to any GUI object or element displayed in any GUI environment, operating system, or theme, wherein known characteristics or attributes of a target area in the GUI environment 110 may be used to identify a GUI element.

Referring back to FIG. 1, for example, if it is known or presumed that the color of the caption bar 155 (i.e., a target GUI) for an active window is blue, for example, in a default theme, then if an area in the captured image of the display is found to have the same attributes (e.g., shape, color, etc.) as the caption bar 155, then it may be presumed that the detected area is the caption bar 155. Once an area in the captured image is determined (at least presumably) to be a match for the caption bar 155 for the active window, then the horizontal and vertical borders of the active window (an ultimately the entire active window) may be detected if the geometric shape of the active window is known.

Figure 2A:
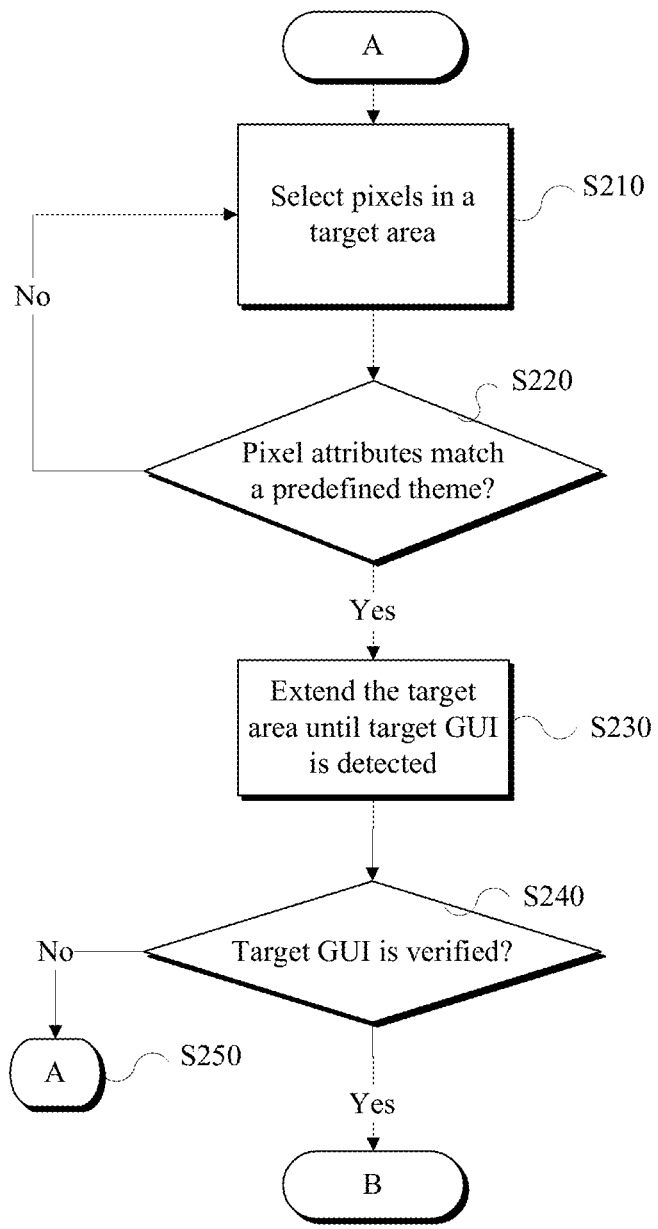
FIGS. 2A and 2B are exemplary flow diagrams of one or more methods of monitoring events occurring in a computing environment by way of screen capture, in accordance with one embodiment.

Referring to FIG. 2A, to detect an active window in GUI environment 110, a target area in a captured image is identified and one or more pixels in the target area are selected (S210). The target area may be selected randomly or based on other criteria. In one implementation, the prior knowledge of the default or standard settings in GUI environment 122 may be used to create a set of templates. For example, a first template may be based on a blue theme, a second template may be based on a yellow theme and so on, depending on the display features of the GUI environment 122.

In a compare phase, the visual attributes of the selected pixels in the target area may be compared with one or more of the template to find the best match. If a match is found, then additional selections (i.e., an extended selection) from the neighboring areas (i.e., one or more pixels in the adjacent rows or columns) of the target area may be selected and compared against the same template or theme. If the attributes of the selected pixels in the target area in the capture image do not match the first template or predefined theme (S220), the pixel attributes are compared to the next template or theme until a match is found or until it is determined that no match exists. If no match is found, then one or more pixels in a different target area may be selected (e.g., reverting back to the scan phase) and the process may continue until a theme is found that matches the attributes of the selected pixels.

If the compare phase is successful, then the selected target area may thus be extended (S230) until it can be determined with a degree of certainty that the target GUI (e.g., caption bar 155) is detected. In other words, the compare phase continues until the position of the entire caption bar 155 is determined (i.e., the edges of the caption bar may be detected as the color of the pixels changes to a different color, when the scan reaches the pixels that define the border of the caption bar). Once the position of the caption bar is detected, a verification scheme may be employed to verify that the detected target GUI is associated with an active GUI element (S240). If the compare phase is not successful in finding a match then the process may be aborted or otherwise handled by a system administrator.

In one embodiment, to perform the verification, an attempt is made to determine if there is any text in the caption bar 155, and if so to recognize the text within the caption bar 155. The text may be recognized by way of a text recognition mechanism or algorithm, for example. The recognized text may be utilized to verify that the identified caption bar 155 is associated with the active window 150. This verification may be achieved, for example, by comparing the recognized text with information available from the system environment that may indicate the name of the active processes at the time. A heuristic may be used to determine that the recognized text has a certain font or font size, or whether the text includes letters or numbers (in contrast to special characters such as dashes, points and commas).

For example, the system environment (e.g., the operating system 122) may have data related to a file that has been recently opened, and thus the file name may be available for the purpose of verification. In settings where the file name is displayed as text in the caption bar 155, for example, the recognized text would match the file name. As such, in this example, if the recognized text is the same as the file name, then it may be verified that the detected caption bar is associated with an active window that corresponds to an application used to, for example, edit the respective file.

In one embodiment, the recognition scheme for the text in the caption bar may be performed no more than once, after the caption bar has been detected. If no text is found within the detected caption bar, it may be concluded that the caption bar is not for an active window, and the process may continue by attempting to find pixels in another target area that may define a caption bar (S210). That is, other areas in the captured image for the GUI environment 110 may be investigated in a similar way, desirable from the position where the earlier scanning was stopped, to find the caption bar for the active window in another target area.

Figure 2B:
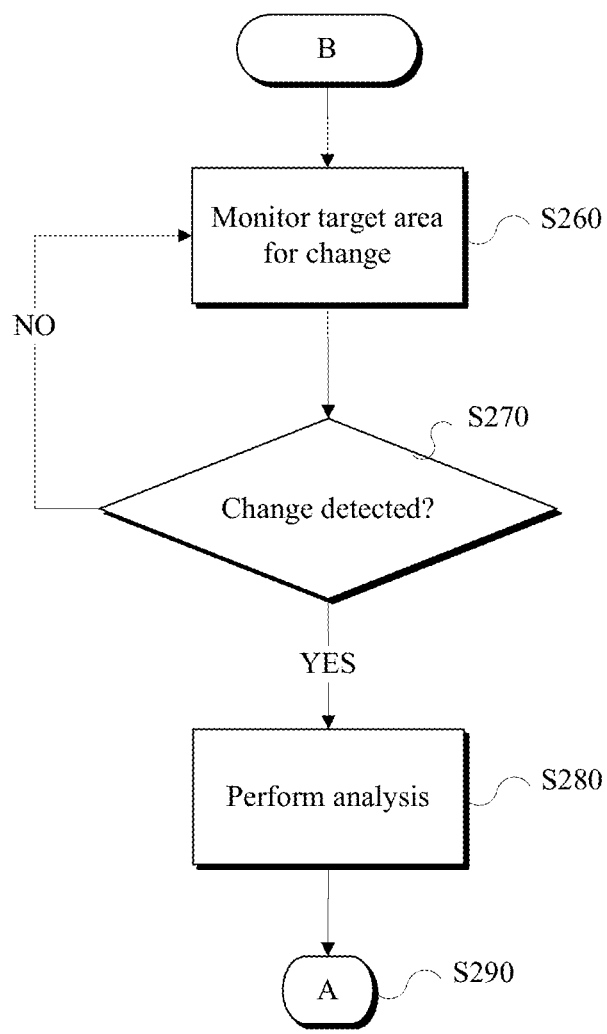

Referring to FIG. 2B, when the caption bar for the active window is successfully detected and located, then in a monitoring phase the target area or more particularly certain focus areas in the caption bar may be monitored (S260) to determine if the active window has lost focus, has changed position, or changed its title (S270). The focus areas may be areas of the caption bar that change color if the caption bar is no longer active.

For example, in Microsoft Windows, the color of a caption bar may change from blue to white (or opaque to transparent) if the window's status changes from active to inactive. Or as another example, the text in the caption bar for an active window may change, once the window becomes inactive. In one implementation, areas of the caption bar (e.g., not the entire caption bar) that reflect such changes may be monitored as focus points or focus areas to determine the change in status of a window.

If a change in the status of a window is detected, then certain analysis may be performed (S280) to generate an output that is usable by a system administrator to understand certain attributes associated with the active window. For example, the analysis results may indicate how long the window was active. In accordance with one aspect of the disclosed system, if a change in the status of the active window is detected, the processes referred to earlier involving the scan and compare phases may be initiated again to find a newly activate window (S290).

To preserve resources, the focus areas may be monitored based on detection of changes in a small number of pixels. For example, a row of 20 pixels along the area where the text in the caption bar is displayed may be monitored, instead of performing continued text recognition for the entire caption bar to determine if the text has changed. Detecting a change in a row of pixels in the text may signify a change in the status of the caption bar, with an acceptable level of accuracy and a relatively high degree of efficiency, for example. Accordingly, if a change in an attribute (e.g., color or pattern) of a focus area is detectible, a change in the status of the active window may be determined.

In one embodiment, one or more focus areas of approximate size of 3×3 pixels, for example, on both sides of the caption bar may be monitored. Depending on implementation, such example focus areas do not change even when the caption bar's title changes or when the content of the active window is updated. As such, detecting a change in the above focus areas may indicate that either the active window has been moved or resized, or that the active window has become inactive.

Advantageously, as proposed in the above example embodiments, monitoring the focus areas that include a small number of pixels (e.g., a few tens of pixels) helps improve over the alternative state of the art approaches that require a full screen capture at predefined intervals and monitoring changes for most, if not all, the captured pixels in the image. One would appreciate that the overhead associated with storing and monitoring thousands of captured pixels may be excessive and inefficient.

In the above examples, a change in a small number of pixels in at least one focus area may be detected, even if the active window is moved or resized, but nevertheless remains active. To determine whether the window remains in active status, the color or other attributes of the caption bar may be analyzed to verify that the window is still active. This verification process is not associated with a substantial level of overhead, because the last theme utilized to detect the caption bar's attributes may be the first theme on the theme list and thus a search through several themes in the list would not been required to verify that the caption bar's attributes continue to match the attributes of the latest theme or template.

Figure 3:
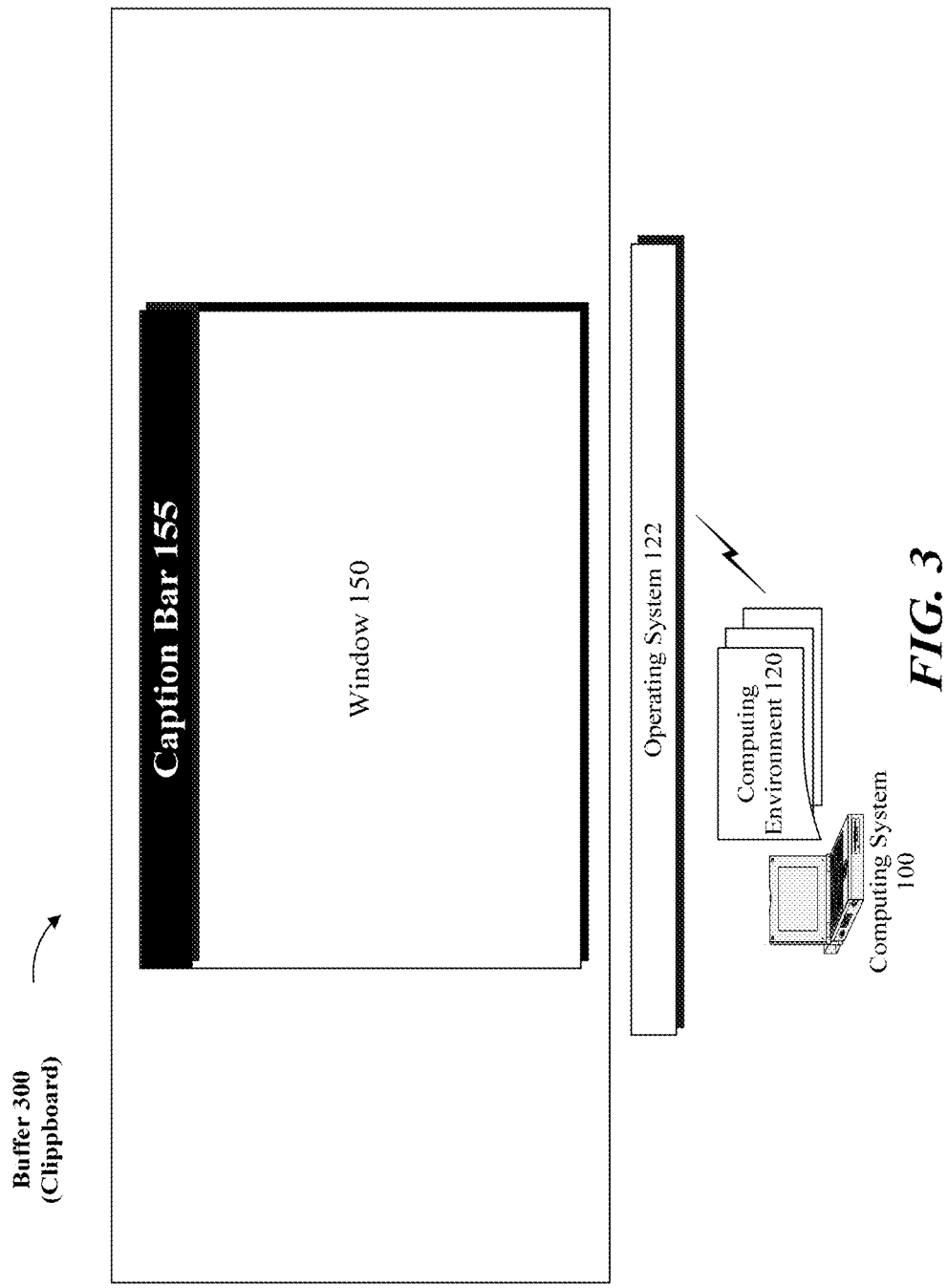
FIG. 3 is a block diagram of exemplary GUI content stored in a temporary data storage medium, in accordance with one embodiment.

In some implementations, for the purpose of calibration, certain control signals may be used to simulate a keyboard input or to capture recognizable GUI components on the display screen, where such components may be used to detect the active theme or the attributes of an active window. Referring to FIG. 3, for example, in the Microsoft Windows operating system, a Control-Alt-PrintScreen key combination command may be used to copy an image of the active window into volatile memory (i.e., a buffer 300 referred to as the "clipboard"). If such functionality is available, the content of the clipboard may be analyzed to, for example, to determine the color of the caption bar for an active window.

Depending on the specifics of a target GUI environment or operating system, the positioning of the caption bar in the image copied to buffer 300 may be predictable. For example, since the entire active window is captured into buffer 300 exclusively without any other graphics outside of the active window being imported, the pixels on the top rows of the copied image may fall within the area where the caption bar is rendered. In this manner, analyzing the content of the clipboard may allow for the detection of the color of the caption bar for an active window, eliminating the need for going through multiple predefined themes or templates to try to find a match.

In one implementation, the caption bar area may be recognized by looking for a large rectangular, and more or less homogenous colored area, close to the top of the screen content copied into buffer 300. The information collected from analyzing the content of buffer 300 may be used to either scan for pixels of a particular color during the scan phase, or alternatively verify whether the active window has been identified. For example, if analyzing the content of buffer 300 indicates that a large rectangular shape on the top portion of the screen content is in color yellow, then it may be concluded that in the existing color theme, the caption bar for an active window will appear in yellow. Based on this analysis, the yellow theme is considered before other themes.

In the above example, from a user's perspective, copying content of the active screen into buffer 300 without the user's knowledge may be deemed intrusive. In order to avoid or limit the intrusive nature of such copying, content that was already stored in buffer 300, if any, prior to the copying of the content of the active window may be restored back into buffer 300. Otherwise, if buffer 300 was empty prior to the copying of the active window into buffer 300, then the content copied into buffer 300 may be erased after the content has been analyzed.

References in this specification to "an embodiment", "one embodiment", "one or more embodiments" or the like, mean that the particular element, feature, structure or characteristic being described is included in at least one embodiment of the disclosed subject matter. Occurrences of such phrases in this specification should not be particularly construed as referring to the same embodiment, nor should such phrases be interpreted as referring to embodiments that are mutually exclusive with respect to the discussed features or elements.

In different embodiments, the claimed subject matter may be implemented as a combination of both hardware and software elements, or alternatively either entirely in the form of hardware or entirely in the form of software. Further, computing systems and program software disclosed herein may comprise a controlled computing environment that may be presented in terms of hardware components or logic code executed to perform methods and processes that achieve the results contemplated herein. Said methods and processes, when performed by a general purpose computing system or machine, convert the general purpose machine to a specific purpose machine.

Figure 4A:
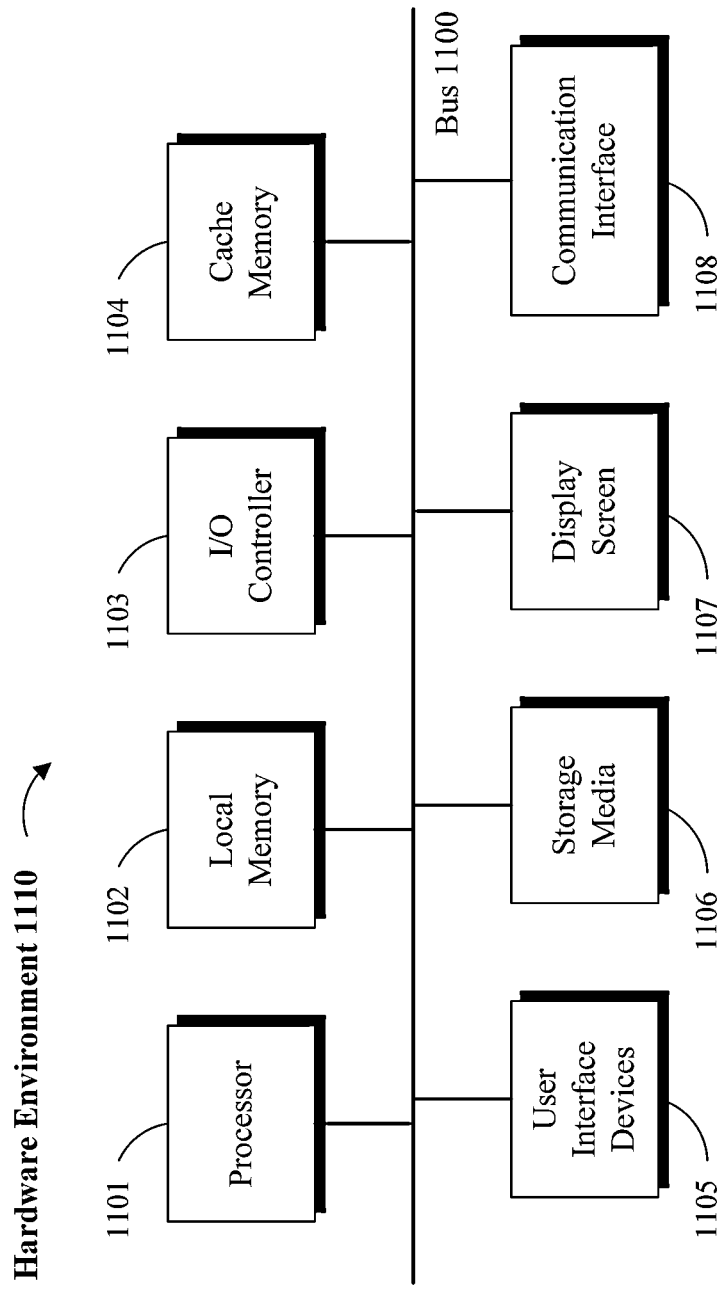
FIGS. 4A and 4B are block diagrams of hardware and software environments in which the disclosed systems and methods may operate, in accordance with one or more embodiments.
Figure 4B:
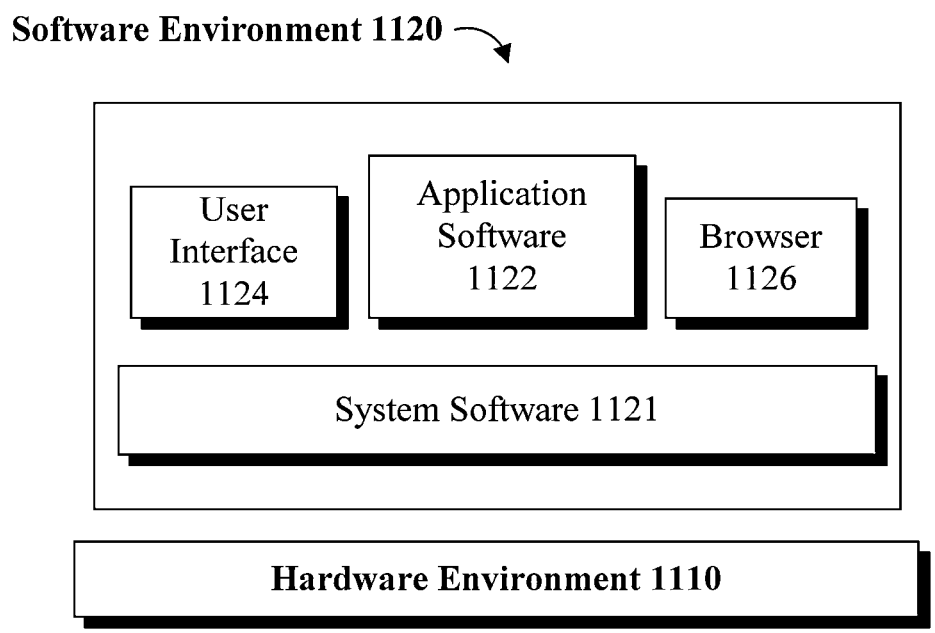

Referring to FIGS. 4A and 4B, a computing system environment in accordance with an exemplary embodiment may be composed of a hardware environment 1110 and a software environment 1120. The hardware environment 1110 may comprise logic units, circuits or other machinery and equipments that provide an execution environment for the components of software environment 1120. In turn, the software environment 1120 may provide the execution instructions, including the underlying operational settings and configurations, for the various components of hardware environment 1110.

Referring to FIG. 4A, the application software and logic code disclosed herein may be implemented in the form of machine readable code executed over one or more computing systems represented by the exemplary hardware environment 1110. As illustrated, hardware environment 110 may comprise a processor 1101 coupled to one or more storage elements by way of a system bus 1100. The storage elements, for example, may comprise local memory 1102, storage media 1106, cache memory 1104 or other machine-usable or computer readable media. Within the context of this disclosure, a machine usable or computer readable storage medium may include any recordable article that may be utilized to contain, store, communicate, propagate or transport program code.

A computer readable storage medium may be an electronic, magnetic, optical, electromagnetic, infrared, or semiconductor medium, system, apparatus or device. The computer readable storage medium may also be implemented in a propagation medium, without limitation, to the extent that such implementation is deemed statutory subject matter. Examples of a computer readable storage medium may include a semiconductor or solid-state memory, magnetic tape, a removable computer diskette, a random access memory (RAM), a read-only memory (ROM), a rigid magnetic disk, or an optical disk. Current examples of optical disks include compact disk, read only memory (CD-ROM), compact disk read/write (CD-R/W), digital video disk (DVD), high definition video disk (HD-DVD) or Blue-Ray™ disk.

In one embodiment, processor 1101 loads executable code from storage media 1106 to local memory 1102. Cache memory 1104 optimizes processing time by providing temporary storage that helps reduce the number of times code is loaded for execution. One or more user interface devices 1105 (e.g., keyboard, pointing device, etc.) and a display screen 1107 may be coupled to the other elements in the hardware environment 1110 either directly or through an intervening I/O controller 1103, for example. A communication interface unit 1108, such as a network adapter, may be provided to enable the hardware environment 1110 to communicate with local or remotely located computing systems, printers and storage devices via intervening private or public networks (e.g., the Internet). Wired or wireless modems and Ethernet cards are a few of the exemplary types of network adapters.

It is noteworthy that hardware environment 1110, in certain implementations, may not include some or all the above components, or may comprise additional components to provide supplemental functionality or utility. Depending on the contemplated use and configuration, hardware environment 1110 may be a machine such as a desktop or a laptop computer, or other computing device optionally embodied in an embedded system such as a set-top box, a personal digital assistant (PDA), a personal media player, a mobile communication unit (e.g., a wireless phone), or other similar hardware platforms that have information processing or data storage capabilities.

In some embodiments, communication interface 1108 acts as a data communication port to provide means of communication with one or more computing systems by sending and receiving digital, electrical, electromagnetic or optical signals that carry analog or digital data streams representing various types of information, including program code. The communication may be established by way of a local or a remote network, or alternatively by way of transmission over the air or other medium, including without limitation propagation over a carrier wave.

As provided here, the disclosed software elements that are executed on the illustrated hardware elements are defined according to logical or functional relationships that are exemplary in nature. It should be noted, however, that the respective methods that are implemented by way of said exemplary software elements may be also encoded in said hardware elements by way of configured and programmed processors, application specific integrated circuits (ASICs), field programmable gate arrays (FPGAs) and digital signal processors (DSPs), for example.

Referring to FIG. 4B, software environment 1120 may be generally divided into two classes comprising system software 1121 and application software 1122 as executed on one or more hardware environments 1110. In one embodiment, the methods and processes disclosed here may be implemented as system software 1121, application software 1122, or a combination thereof. System software 1121 may comprise control programs, such as an operating system (OS) or an information management system, that instruct one or more processors 1101 (e.g., microcontrollers) in the hardware environment 1110 on how to function and process information. Application software 1122 may comprise but is not limited to program code, data structures, firmware, resident software, microcode or any other form of information or routine that may be read, analyzed or executed by a processor 1101.

In other words, application software 1122 may be implemented as program code embedded in a computer program product in form of a machine-usable or computer readable storage medium that provides program code for use by, or in connection with, a machine, a computer or any instruction execution system. Moreover, application software 1122 may comprise one or more computer programs that are executed on top of system software 1121 after being loaded from storage media 1106 into local memory 1102. In a client-server architecture, application software 1122 may comprise client software and server software. For example, in one embodiment, client software may be executed on a client computing system that is distinct and separable from a server computing system on which server software is executed.

Software environment 1120 may also comprise browser software 1126 for accessing data available over local or remote computing networks. Further, software environment 1120 may comprise a user interface 1124 (e.g., a graphical user interface (GUI)) for receiving user commands and data. It is worthy to repeat that the hardware and software architectures and environments described above are for purposes of example. As such, one or more embodiments may be implemented over any type of system architecture, functional or logical platform or processing environment.

It should also be understood that the logic code, programs, modules, processes, methods and the order in which the respective processes of each method are performed are purely exemplary. Depending on implementation, the processes or any underlying sub-processes and methods may be performed in any order or concurrently, unless indicated otherwise in the present disclosure. Further, unless stated otherwise with specificity, the definition of logic code within the context of this disclosure is not related or limited to any particular programming language, and may comprise one or more modules that may be executed on one or more processors in distributed, non-distributed, single or multiprocessing environments.

As will be appreciated by one skilled in the art, a software embodiment may include firmware, resident software, micro-code, etc. Certain components including software or hardware or combining software and hardware aspects may generally be referred to herein as a "circuit," "module" or "system." Furthermore, the subject matter disclosed may be implemented as a computer program product embodied in one or more computer readable storage medium(s) having computer readable program code embodied thereon. Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing.

In the context of this document, a computer readable storage medium may be any tangible medium that can contain, or store a program for use by or in connection with an instruction execution system, apparatus, or device. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Program code embodied on a computer readable storage medium may be transmitted using any appropriate medium, including but not limited to wireless, wireline, optical fiber cable, RF, etc., or any suitable combination of the foregoing. Computer program code for carrying out the disclosed operations may be written in any combination of one or more programming languages, including an object oriented programming language such as Java, Smalltalk, C++ or the like and conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Certain embodiments are disclosed with reference to flowchart illustrations or block diagrams of methods, apparatus (systems) and computer program products according to embodiments. It will be understood that each block of the flowchart illustrations or block diagrams, and combinations of blocks in the flowchart illustrations and/or block diagrams, can be implemented by computer program instructions. These computer program instructions may be provided to a processor of a general purpose computer, a special purpose machinery, or other programmable data processing apparatus to produce a machine, such that the instructions, which execute via the processor of the computer or other programmable data processing apparatus, create means for implementing the functions or acts specified in the flowchart or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function or act specified in the flowchart or block diagram block or blocks.

The computer program instructions may also be loaded onto a computer, other programmable data processing apparatus, or other devices to cause a series of operational steps to be performed on the computer, other programmable apparatus or other devices to produce a computer or machine implemented process such that the instructions which execute on the computer or other programmable apparatus provide processes for implementing the functions or acts specified in the flowchart or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical functions. It should also be noted that, in some alternative implementations, the functions noted in the block may occur in any order or out of the order noted in the figures.

For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, may be implemented by special purpose hardware-based systems that perform the specified functions or acts, or combinations of special purpose hardware and computer instructions.

The claimed subject matter has been provided here with reference to one or more features or embodiments. Those skilled in the art will recognize and appreciate that, despite of the detailed nature of the exemplary embodiments provided here, changes and modifications may be applied to said embodiments without limiting or departing from the generally intended scope. These and various other adaptations and combinations of the embodiments provided here are within the scope of the disclosed subject matter as defined by the claims and their full set of equivalents.

What is claimed is:

1. A method for recognizing change in a graphical user interface (GUI) environment, the method comprising:
copying a first active GUI window in the GUI environment into memory via one or more operating system commands for copying, into memory, images of active GUI windows only;
selecting a first area in the GUI environment;
determining that the first area corresponds to a second active GUI window in the GUI environment by comparing pixels in a top row of the first area to pixels in a top row of the copied first active GUI window;
determining position of the second active GUI window in the GUI environment based on expanding the first area in size until a threshold area is reached that does not match the first active GUI window;
monitoring a focus area in the second active GUI window to detect visual changes in attributes of the focus area, without regard to any visual changes outside the focus area;
determining whether the second active GUI window has moved or has been resized, in response to determining a visual change in the attributes of the focus area; and
determining position of a third active GUI window in the GUI environment, in response to determining that the second active GUI window has not been moved or has not been resized.

2. The method of claim 1, wherein the attributes comprise pixel attributes.

3. The method of claim 1, wherein the GUI window has a title bar including text that reflects a name of an active project.

4. The method of claim 3, wherein the focus area is an area that covers part but not all of the text in the title bar.

5. The method of claim 4, wherein a character recognition scheme is used to detect changes in the text in the title bar.

6. The method of claim 1 wherein determining that the first area corresponds to the second active GUI window and determining the position of the second active GUI window further comprise:
comparing attributes of the first area with attributes of a first theme from among a plurality of themes, wherein the plurality of themes are compiled based on knowledge of common themes utilized to implement the GUI environment;
determining that the attributes of the first area match the first theme; and
expanding the first area in size, in response to determining that the attributes of the first area match the first theme, until a threshold area is reached that does not match the first theme.

7. The method of claim 6 wherein determining that the first area corresponds to the second active GUI window and determining the position of the second active GUI window further comprise:
comparing attributes of the first area with attributes of other themes in the plurality of themes, in response to determining that the attributes of the first area do not match the first theme until a second theme is found that matches the attributes of the first area; and
expanding the first area in size, in response to determining that the attributes of the first area match the second theme, until a threshold area is reached that does not match the second theme.

8. The method of claim 7 further comprising:
selecting a second area in the GUI environment, in response to determining that attributes of the first area do no match any of the plurality of themes; and
comparing attributes of the second area with attributes of one or more themes in the plurality of themes, until a theme is found that matches the attributes of the second area.

9. The method of claim 1, wherein:
the second active GUI window includes a caption bar with a corresponding color;
the focus area includes at least part of the caption bar; and
the visual change in the attributes of the focus area includes a change in the color of the second active GUI window.

10. The method of claim 9, wherein the focus area is a single row of pixels.

11. A system for recognizing change in a graphical user interface (GUI) environment, the system comprising:
one or more computer processors; and
a computer readable storage medium;
wherein the one or more computer processors are programmed to run program instructions stored on the computer readable storage medium, wherein the program instructions include:
program instructions for copying a first active GUI window in the GUI environment into memory via one or more operating system commands for copying, into memory, images of active GUI windows only;
program instructions for selecting a first area in the GUI environment;
program instructions for determining that the first area corresponds to a second active GUI window in the GUI environment by comparing pixels in a top row of the first area to pixels in a top row of the copied first active GUI window;
program instructions for determining position of the second active GUI window in the GUI environment based on expanding the first area in size until a threshold area is reached that does not match the first active GUI window;
program instructions for monitoring a focus area in the second active GUI window to detect visual changes in attributes of the focus area, without regard to any visual changes outside the focus area;
program instructions for determining whether the second active GUI window has moved or has been resized, in response to determining a visual change in the attributes of the focus area; and
program instructions for determining position of a third active GUI window in the GUI environment, in response to determining that the second active GUI window has not been moved or has not been resized.

12. The system of claim 11, wherein the attributes comprise pixel attributes.

13. The system of claim 11, wherein the GUI window has a title bar including text that reflects a name of an active project.

14. The system of claim 13, wherein the focus area is an area that covers part but not all of the text in the title bar.

15. A computer program product comprising a computer readable storage medium having a computer readable program, wherein the computer readable storage medium is not a transitory signal per se, wherein the computer readable program when executed on a computer causes the computer to:

copy a first active GUI window in the GUI environment into memory via one or more operating system commands for copying, into memory, images of active GUI windows;

select a first area in the GUI environment;

determine that the first area corresponds to a second active GUI window in the GUI environment by comparing pixels in a top row of the first area to pixels in a top row of the copied first active GUI window;

determine position of the second active GUI window in the GUI environment based on expanding the first area in size until a threshold area is reached that does not match the first active GUI;

monitor a focus area in the second active GUI window to detect visual changes in attributes of the focus area, without regard to any visual changes outside the focus area;

determine whether the second active GUI window has moved or has been resized, in response to determining a visual change in the attributes of the focus area; and determine position of a third active GUI window in the GUI environment, in response to determining that the second active GUI window has not been moved or has not been resized.

16. The computer program product of claim 15, wherein the attributes comprise pixel attributes.

17. The computer program product of claim 15, wherein the GUI window has a title bar including text that reflects a name of an active project.

18. The computer program product of claim 17, wherein the focus area is an area that covers part but not all of the text in the title bar.

* * * * *